United States Patent
Kurungot et al.

(10) Patent No.: US 10,501,317 B2
(45) Date of Patent: Dec. 10, 2019

(54) HIGH ASPECT RATIO NANOSCALE MULTIFUNCTIONAL MATERIALS

(75) Inventors: Sreekumar Kurungot, Maharashtra (IN); Beena Kalasaparambil Balan, Maharashtra (IN); Ulhas Kanhaiyalal Kharul, Maharashtra (IN); Vijayamohanan Kunjuukrishna Pillai, Maharashtra (IN)

(73) Assignee: Council of Scientific & Industrial Research, New Delhi (IN)

( * ) Notice: Subject to any disclaimer, the term of this patent is extended or adjusted under 35 U.S.C. 154(b) by 596 days.

(21) Appl. No.: 13/065,540

(22) Filed: Mar. 24, 2011

(65) Prior Publication Data
US 2012/0245018 A1 Sep. 27, 2012

(51) Int. Cl.
| | | |
|---|---|---|
| B01J 35/06 | (2006.01) |
| B01J 37/02 | (2006.01) |
| B82Y 30/00 | (2011.01) |
| B82Y 40/00 | (2011.01) |
| H01M 4/96 | (2006.01) |

(52) U.S. Cl.
CPC ............ B82Y 30/00 (2013.01); B82Y 40/00 (2013.01); H01M 4/96 (2013.01)

(58) Field of Classification Search
CPC ....... D01D 5/24; D01D 5/247; H01M 4/0459; H01M 8/00–086; H01M 8/10–2495; B82Y 30/00
USPC ......................................... 428/376, 398, 400
See application file for complete search history.

(56) References Cited

U.S. PATENT DOCUMENTS

| | | | | |
|---|---|---|---|---|
| 6,602,630 B1 * | 8/2003 | Gopal | ................ | H01M 8/1004 429/304 |
| 7,405,021 B2 * | 7/2008 | Gascoyne et al. | ............ | 429/483 |
| 2003/0026985 A1 * | 2/2003 | Greiner et al. | ............... | 428/373 |
| 2007/0207361 A1 * | 9/2007 | Yamashita | ....................... | 429/33 |
| 2007/0243124 A1 * | 10/2007 | Baughman | ............. | B82Y 30/00 423/447.1 |
| 2008/0124597 A1 * | 5/2008 | Murata | ................. | H01M 8/004 429/434 |
| 2009/0136818 A1 * | 5/2009 | Fujibayashi | ....... | B01D 67/0088 429/493 |

OTHER PUBLICATIONS

Balan et al., High aspect ratio nanoscale multifunctional materials derived from hollow carbon nanofiber by polymer insertion and metal decoration. Chem. Commun., 2010, 46, 5590-5592. First published as an Advance Article on the web Jun. 24, 2010. DOI: 10.1039/c0cc00571a.*

Ajayan, et al., *Capillarity-induced filling of carbon nanotubes*, Nature, 361:333-334 (1993).

Faupel et al., *Metal-Polymer Nanocomposites for Functional Applications*, Advanced Engineering Materials, 12(12):1177-1190 (Nov. 2010).

(Continued)

*Primary Examiner* — Elizabeth C Imani
*Assistant Examiner* — Kevin Worrell
(74) *Attorney, Agent, or Firm* — Fish & Richardson P.C.

(57) ABSTRACT

The present invention discloses high aspect ratio multifunctional nanocomposite of CNF/polymer comprising of functionalized CNF incorporated with metal nanoparticles and phosphoric acid doped polybenzimidazole (PBI) along the inner and outer surfaces of hollow carbon nanofiber and to a process for fabrication of the same thereof.

15 Claims, 8 Drawing Sheets

(56) References Cited

OTHER PUBLICATIONS

Fujigaya, *Developments of Novel Functional Materials for Carbon Nanotube/Polymer Hybrid*, Polymers, 58(8) (Aug. 2009).
He et al., *Synthesis of Poly[2,2'-(m-phenylene)-5,5'-bibenzimidazole] and Poly(2,5 polybenzimidazole) by Microwave Irradiation*, Chem. Res. Chinese Universities, 25(4):585-589 (2009).
Kim et al., *Characteristics of supercapaitor electrodes of PBI-based carbon nanofiber web prepared by electrospinning*, Electrochimica Acta, 50(2-3):877-881 (Nov. 2004).
Kim, et al., *Self-Sustained Thin Webs Consisting of Porous Carbon Nanofibers for Supercapacitors via the Electrospinning of Polyacrylonitrile Solutions Containing Zinc Chloride*, Adv. Mater., 19(17):2341-2346 (Sep. 2007).
Knupp et al., *The effect of experimental parameters on the synthesis of carbon nanotube/nanofiber supported platinum by polyol processing techniques*, Carbon, 46:1276-1284 (2008).
Skoulidas, et al., *Adsorption and diffusion of carbon dioxide and nitrogen through single-walled carbon nanotube membranes*, J Chem. Phys. 124:054708 (2006).

\* cited by examiner

HIGH ASPECT RATIO NANOSCALE MULTIFUNCTIONAL MATERIALS

TECHNICAL FIELD OF INVENTION

The present invention relates to a high aspect ratio nanoscale multifunctional material derived from hollow carbon nanofiber by polymer insertion and metal decoration. More particularly, the present invention provides a process for the fabrication of this multifunctional material.

BACKGROUND OF THE INVENTION

Design of multifunctional materials has triggered wide interest in a variety of fields like energy generation and storage, catalysis and sensing mainly as they can perform multiple functions simultaneously in time (C. Kim, B. T. N. Ngoc, K. S. Yang, M. Kojima, Y. A. Kim, Y. J. Kim, M. Endo, S. C. Yang, Adv. Mater., 2007, 19, 2341).

High aspect ratio one-dimensional structures of carbon such as nanotubes and nanofibers are considered to be most versatile for the fabrication of multifunctional materials considering their widespread applications, unique structure and fascinating mechanical, thermal and electrical properties. Imparting surface sensitive functions such as charge storage, ionic transport, reactivity, sensing ability etc. on these carbon morphologies can significantly broaden the techno-commercial importance of the materials by bringing radical changes in the design aspects of many systems.

Different techniques have been explored for implementing such nanomorphologies in practical devices.

Article titled "Metal-Polymer Nanocomposites for Functional Applications" by Prof. Dr. F. Faupel et al, DOI: 10.1002/adem describes the preparation of polymer-based nanocomposites by wet technique (2.2) consisting of metal nanoparticles in a polymer matrix and the resulting functional properties. The nanoparticles are produced by chemical methods to obtain exact particle size and shape. They are then dispersed in a polymer solution or in a monomer solution for subsequent polymerization.

Volume 50, Issues 2-3, 30 Nov. 2004, Pages 877-881 having doi:10.1016/j.electacta.2004.02.071, discloses polybenzimidazole (PBI) solutions of dimethyl acetamide (DMAc) which are electrospun to be webs consisting of 250-nm ultra-fine fibers. The webs are carbonized, activated by steam, to obtain activated carbon nanofibers (ACNFs).

Article titled "Synthesis of Poly[2,2'-(m-phenylene)-5,5'-bibenzimidazole] and Poly(2,5 polybenzimidazole) by Microwave Irradiation" by HE Rong-huan et al; in Chem. Res. Chinese Universities, 2009, volume 25(4), pgs 585-589 describes synthesis of PBI wherein 3,3'-diaminobenzidine tetrahydrochloride (DAB'4HCl' $2H_2O$) is dissolved in polyphosphoric acid (PPA, 85% $P_2O_5$) under nitrogen inert atmosphere at about 140° C. followed by addition of isophthalic acid (IPA) at 170° C. and further heated at 200° C. to perform the polycondensation. The acid enwrapped was removed by soaking the solution in sodium bicarbonate, filtered, and washed with water till pH value of the washing water was about 7. The polymer was finally obtained by drying at 120° C. for at least 24 h.

Article titled "The effect of experimental parameters on the synthesis of carbon nanotube/nanofiber supported platinum by polyol processing techniques" by Seth L. Knupp et al, in Carbon, volume 4 6 (2008), pgs 1276-1284, describes preparation of carbon nanofiber supported catalyst wherein the carbon supports were exposed to a highly concentrated nitric and sulfuric acid mixture at 60° C., followed by drop wise addition of appropriate amount of precursor Potassium tetrachloroplatinate ($K_2PtCl_4$). The solution was heated at 125° C. for 2 h using an oil bath, under refluxing conditions and agitation. In the case of microwave irradiation method, the solution was heated in a domestic microwave oven. Platinized samples were dried at 100° C. in a nitrogen environment.

Article titled "Developments of Novel Functional Materials for Carbon Nanotube/Polymer Hybrid" by Tsuyohiko Fujigaya in Polymers—Vol. 58, No. 8 (August, 2009), discloses a polybenzimidazole (PBI)/CNT composite. Accordingly, PBI is wrapped around CNT followed by Pt loading on the CNT via a coordinative mechanism.

The literature reveals that the processes developed for the impartment of multifunctional characteristics include stringent experimental conditions like in-situ synthetic approaches, surfactant assisted methods or physical approaches, sophisticated instruments, series of different steps which may lead to hampering of certain desired and/or inherent properties.

Further, to date, most of the reports addresses the encapsulation of materials in the inner cavity of carbon nanotube that adopt complicated experimental conditions like gas-phase diffusion, filling from molten media or by using supercritical $CO_2$ (P. M. Ajayan, S. Iijima, Nature, 1993, 361, 333; Skoulidas, D. S. Sholl, J. K. Johnson, J. Chem. Phys. 2006, 124, 1).

There is, therefore, a need to provide a multifunctional nanocomposite and a method for fabrication thereof which is simple and which does not destroy the inherent properties of the individual constituents of the nanocomposite.

OBJECT OF THE INVENTION

The main objective of the present invention is to provide a high aspect ratio nanoscale multifunctional material derived from hollow carbon nanofiber by polymer insertion and metal decoration.

Another objective of the present invention to provide a high aspect ratio nanocomposite possessing imparted multifunctional characteristics.

Another object of the present invention is to develop a multifunctional system derived of hollow carbon nanofibers by polymer insertion and particle decoration.

Yet another object of the present invention is to adopt a process for the fabrication of the high aspect ratio nanoscale multifunctional material derived from hollow carbon nanofiber by polymer insertion and metal decoration which is simple, avoids the use of stringent chemical processes and which retains the inherent properties of the individual constituents.

SUMMARY OF THE INVENTION

Accordingly, the present invention relates to a high aspect ratio nanoscale multifunctional material derived from hollow carbon nanofiber by polymer insertion and metal decoration. More particularly, the present invention provides a process for the fabrication of this multifunctional material.

DETAILED DESCRIPTION OF THE INVENTION

Figure 1:
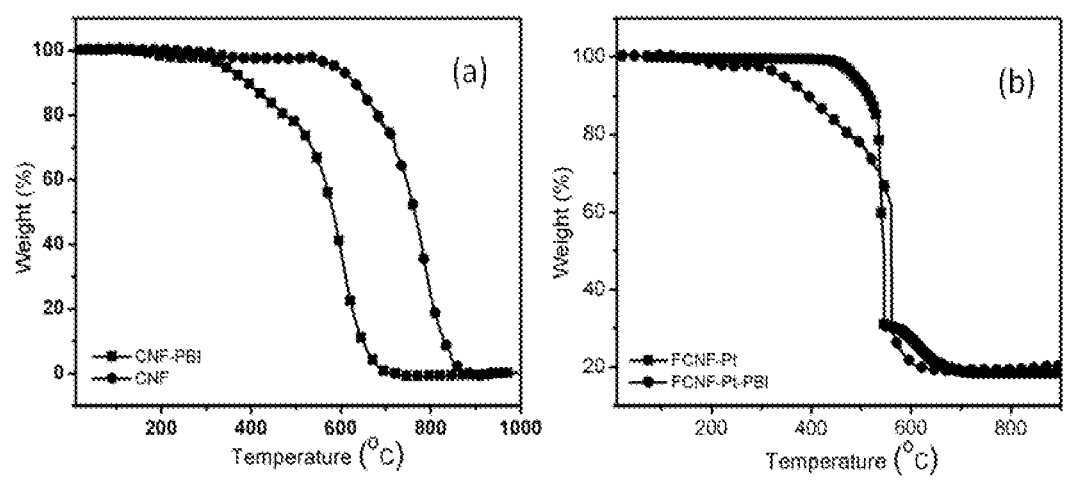
FIG. 1: (a) shows the thermogravimetric analysis (TGA) of CNF before and after the incorporation of PBI and (b) shows TGA corresponding to the electrocatalyst before (FNCF-Pt) and after (FNCF-Pt-PBI) PBI incorporation.

The present invention describes a high aspect ratio nanoscale composite material which can simultaneously perform multiple functions such as proton and electron conductivity and electrocatalytic activity.

In particular, the present invention relates to high aspect ratio nanocomposite composed of functionalised carbon nanofibers (FCNF), phosphoric acid doped poly(benzimidazole) (PBI), and metal nanoparticles with multifunctional characteristics and to a method for the fabrication of the said high aspect ratio nanocomposite.

The use of carbon nanotubes to reinforce and enhance the performance poses several difficulties especially when in composite matrices. Of particular concern is the dispersion behavior of nanotubes in solutions. Further, alignment in the matrices is another major difficulty (since CNTs are anisotropic, they must be aligned in the composite matrix to achieve the optimal mechanical properties), while bonding to the matrices can also be difficult (carbon nanotubes have inert graphite surfaces). In order to overcome the critical issues with CNT embedment in nanocomposites during processing and large scale manufacturing, the present invention is directed to the use of carbon nanofibers with high aspect ratio to reinforce the composites. Carbon nanofibers (CNFs) are mainly differentiated from nanotubes in that, nanofibers can show a wide range of orientations of the graphitic layers with respect to the fiber axis. Commercial (PAN and pitch) carbon fibers are typically in the 7-20 μm diameter range, while vapour-grown carbon fibers (VGCFs) have intermediate diameters ranging from a few hundred nanometres up to around a millimetre.

carbon nanofiber (CNF) can function as a backbone into which the polymer can be inserted along with nano particles to form a composite and which may have a high aspect ratio. The high aspect ratio CNF further can be functionalised in order to produce stable dispersions in the desired solvent.

The polymer is selected from several polymers such as poly(stylene sulfonate), DNA, Nafion, polypyrrole, PBI and such like; preferably PBI and more preferably phosphoric acid doped PBI for CNF polymer composite. Poly(benzimidazole) (PBI) is an excellent solubiliser and can individually wrap CNF based on π-π interactions. Further, PBI attracts strong attention as a proton-conducting material that can be operative even under dry conditions above 100° C. PBI doped with phosphoric acid further enhances the proton movement while the PBI matrix maintains a relatively thermally stable containment for phosphoric acid.

The nanoparticles are selected from noble metals such as Pt, Rh and such like with a size distribution of c.a. 3-4 nm and loaded in the range of 2% to 60%, preferably in the range of 15-25% and more preferably 20% catalyst loading.

The present invention relates to nanocomposite with multifunctional properties comprising of high aspect ratio functionalised carbon nanofiber (FCNF) incorporated with metal nanoparticles and phosphoric acid doped polybenzimidazole (PBI) along the inner and outer surfaces of hollow carbon nanofiber.

The high aspect ratio material is a carbon nanofiber with a length in few micrometers and diameter c.a. 100 nm. Further, the CNF have open tips with inner diameter c.a 50 nm. The high aspect ratio is greater than 10, preferably 10-15.

The proton conducting polymer, i.e. phosphoric acid doped polybenzimidazole (PBI) is incorporated into the inner cavity as well as on the outer surface of a hollow carbon nanofiber (CNF) substrate with open tips. The integrated polymer phase in this hybrid material provides effective pathways for proton delivery to ensure uniform and effective proton distribution while the micro network of the CNF support ensures high electron conductivity. Further, excellent surface reactivity is achieved along with proton and electron conductivity by selective metal decoration on the inner and outer walls of the CNF structure.

It is yet another crucial issue to fabricate carbon nanofiber (CNF) reinforced polymer nanocomposite which can address simultaneously multiple functions such as proton and electron conductivity and surface reactivity while ensuring pathways for reactant distribution and product dissipation.

Phosphoric acid doped PBI and the metal nanoparticles are incorporated on both the inner and outer walls of CNF by a process based on the wetting and capillary action of solvent medium which facilitates to achieve a wider range of applications without much loss of inherent properties of the individual materials.

Both the inner and outer walls of the hollow carbon nanofiber (CNF) are decorated initially with nanosized metal particles followed by phosphoric acid doped PBI encapsulation with electrocatalyst.

The easy polymer insertion in the present invention is accomplished by virtue of optimizing the synthesis parameters of PBI to obtain low viscosity and the solution concentration of the PBI to facilitate its entry into the inner cavity of the CNF through the open tips. The selective inner and outer wall decoration of metal nanoparticles is achieved by polyol process, wherein, both the surface tension and polarity characteristics of the medium are favorably adjusted to facilitate the entry of metal ions into the tubular region by capillary filling and homogeneous wetting of the wall surfaces of CNF by the solvents.

The inherent viscosity of phosphoric acid doped PBI polymer is in the range of 0.1-0.5 dLg$^{-1}$ and the polymer solution concentration is in the range of 0.2-0.3 wt %. The solvent is selected from dipolar aprotic solvents such as acetone, methyl ethyl ketone, ethylacetate, N,N dimethyl acetamide (DMAc) and the like, preferably DMAc.

The present invention discloses a method for the fabrication of multifunctional high aspect ratio nanocomposite; FCNFs-Pt-PBI comprising the steps of;
1. preparing phosphoric acid doped polybenzimidazole polymer by solution polycondensation method;
2. dispersing platinum nanoparticles into the tubular region of the carbon nanofiber by simultaneous dispersion and reduction through polyol process; and
3. encapsulating the polymer in a solvent of step 1 with the catalyst to obtain the desired nanocomposite.

3,3'-diaminodibenzidine (DAB) is completely dissolved in polyphosphoric acid (PPA) at a temperature of 135-142° C. followed by addition of 5-tert-butylisophthalic acid. The temperature is then slowly raised to 165-175° C. and maintained at this temperature for about 5 h under constant flow of nitrogen. The temperature is further raised to 190-200° C. and maintained for 14 h. After completion of the reaction, the reaction mixture is poured on to the stirred water. The precipitated polymer is crushed, washed with water till neutral pH. Further, the polymer is kept overnight in 10% aqueous $Na_2CO_3$, washed with water until neutral pH then soaked in methanol to extract water. The dried polymer is further purified by dissolving in DMAc to get a 0.25 wt. % solution, further reprecipitated on to stirred water. The polymer is dried by adding methanol and further vacuum dried to get the polymer of desired viscosity.

In step 2, dispersion of Pt nanoparticles on the carbon nanofiber is conducted by a modified polyol process using pristine CNF and $H_2O_2$ treated CNF respectively. Accordingly, carbon nanofibers are added to an aqueous ethylene glycol solution (ethylene glycol/water 3:2 v/v), sonicated, followed by dropwise addition of aqueous ethylene glycol solution of $H_2PtCl_6$. Stirred, refluxed at 140° C. for 8 h. The solid material is then collected by filtration, washed and dried under vacuum to obtain the Pt decorated CNF catalyst.

The step 3 involves encapsulation of PBI polymer wherein, PBI solution in DMAc and the catalyst are added to 0.25 wt % of the polymer solution, stirred to obtain homogenous coverage of the inner and outer surfaces of Pt decorated CNF.

Rh nanoparticles in the polymer matrix can also be effectively incorporated inside the cavity of CNF's without any external force. Also, different functional materials such as ionic liquids, semiconducting nanoparticles, biomolecules, magnetic nanoparticles either alone or in combinations thereof may be used to impart multifunctional characteristics. Further, the outer surface of the CNF may be wrapped with one polymer and the inner wall with another polymer while imparting multifunctional characteristics.

The FCNF-Pt-PBI nanocomposite of the present invention is advantageous in the following:
  The nanocomposite can simultaneously perform functions such as proton and electron conductivity and electrocatalytic activity.
  The process for fabrication is simple and avoids any stringent chemical reaction conditions or the use of hazardous chemicals, avoids multiple chemical steps thereby retaining the inherent properties of the constituents used in the nanocomposite.
  Encapsulation of PBI solution inside the nanofibers provides an improved electronic property of the support coupled with the improved proton conductivity.
  The fabrication by wetting process involving the insertion of the polymer and nanoparticle by capillary action results in effective utilization of the inner cavity of the carbon nanofibers thus enabling the system to simultaneously address multiple functions.

INDUSTRIAL APPLICABILITY

The nanocomposite FCNF-Pt-PBI of the present invention can be used in
  Fuel cell
  Solar cell
  Supercapacitors and sensors
  Drug delivery systems The present invention is illustrated herein below with examples, which are illustrative only and should not be construed to limit the scope of the present invention in any manner.

EXAMPLES

Experimental

Materials and Methods:
  Hydrogen hexachloroplatinate hexahydrate ($H_2PtCl_6.6H_2O$), 3,3'-diaminobenzidine (DAB), polyphosphoric acid (PPA) and 5-tert-butyl isophthalic acid were procured from M/s. Aldrich Chemicals. N,N-dimethyl acetamide (DMAc), ethylene glycol (EG), perchloric acid ($HClO_4$) were procured from Rankem Chemicals. All the chemicals were used as received without any further purification. A poly(tetrafluoroethylene) (PTFE) filter paper (pore size, 0.45 μm; Rankem) was used for the filtration. A copper grid with a carbon support (Icon Analytical Inc.) was used for the HRTEM observations.

I: Preparation of FCNF-Pt-PBI Nanocomposite
  a. Preparation of Polybenzimidazole (PBI):
  Polybenzimidazole was synthesized by solution polycondensation method using polyphosphoric acid (PPA) as the solvent. In a typical procedure, a three-necked flask equipped with a mechanical stirrer, $N_2$ inlet and $CaCl_2$ drying tube was charged with 500 g of PPA, 10 g (0.0467 mol) of 3,3'-diaminobenzidine (DAB) and the temperature was elevated to 140° C. After complete dissolution of DAB, 11.414 g (0.0514 mol) of 5-tert-butylisophthalic acid was added; temperature was slowly raised to 170° C. and maintained for 5 h under constant flow of $N_2$. The temperature was further raised to 200° C. and maintained for 14 h. After completion of the reaction, temperature was lowered and the highly viscous reaction mixture was poured on to the stirred water. The precipitated polymer was crushed and thoroughly washed with water till neutral pH. The polymer was then kept overnight in 10% aqueous $Na_2CO_3$, washed with water until neutral pH and soaked in methanol for 8 h to extract the water. Dried polymer (100° C., 3 days) was further purified by dissolving in N,N-dimethyl acetamide (DMAc) to get a 0.25 wt. % solution, removing undissolved material, if any, by centrifugation at 3000 rpm for 3 h and reprecipitation on to stirred water. The polymer was kept in methanol for 8 h, filtered, dried at 60° C. for 24 h and then in vacuum oven at 100° C. for a week. The inherent viscosity of the polymer was 0.47 dLg-1 using 0.2 $gdL^{-1}$ polymer solution in DMAc.
  b. Preparation of Carbon Nanofiber Supported Catalyst:
  In pristine carbon nanofibers only the inner wall is inherently active, so if Pt nanoparticles are decorated on pristine carbon nanofibers this will result into decoration only in the inner wall. So the outer wall of the pristine CNFs are activated by an $H_2O_2$ treatment, i.e. 1 gm of CNF is treated with 200 ml (30%) $H_2O_2$ at 60° C. for 6 hours. Hereafter mentioned as FCNF. This results into activation of outer as well as the inner walls of CNFs, Decoration of Pt nanoparticles only in the inner cavity and on both the walls is achieved by a modified polyol process using pristine and $H_2O_2$ treated CNFs respectively. To facilitate metal dispersion into the tubular region of the carbon nanofiber, simultaneous metal ion dispersion and reduction were accomplished through a polyol process by carefully optimizing the polyol-water ratio to achieve balanced surface tension and polarity characteristics. The modification of the polyol process by using a proper composition of polyol and water is a critical step to facilitate reactants entry into the tubular region and homogeneous wetting of the inner wall surface by the solvents. In the typical synthesis, 400 mg of the support material, FCNF was added to an aqueous ethylene glycol solution (ethylene glycol/water 3:2 v/v, 600 mL) and dispersed by sonication. In the next step, aqueous ethylene glycol solution of $H_2PtCl_6$ (517 mg in ethylene glycol/water 3:2 v/v, 900 mL) was added drop by drop with stirring. Subsequently, the mixture was kept under stirring for 5 h at ambient temperature to achieve well dispersion of the components in the mixture. In case of nanofibers with straw type morphology, this aging time is important because the precursor solution has to be reached inside the tubes of the support material. After the stirring process, the mixture was refluxed at 140° C. for 8 h. The solid material was then collected by filtration and washed with water and dried under vacuum to obtain the Pt decorated CNF samples.

c. PBI Encapsulation with Electrocatalyst:

The critical parameter that determines the entry of the polymer into the inner cavity is the viscosity and surface tension of the solvent medium. So to ensure the PBI entry into the cavity, PBI solution in DMAc was selected and 1 mg of the catalyst (1 g of CNF is treated with 200 ml 30% H2O2 and 20 wt % Pt is decorated on the CNF, called FCNF-Pt) was added to 1 mL of 0.25 wt. % of the polymer solution. To get a uniform dispersion and to initiate the PBI entry into the cavity, the mixture was initially sonicated using a bathtype sonicator for 10 min. and subsequently kept stirring for 10 h at room temperature to facilitate PBI entry into the tubular region and homogeneous coverage along the inner and outer surfaces.

II: Characterization of Nanocomposite Multifunctional Material a. Thermogravimetric Analysis (TGA):

Thermogravimetric analysis was performed on a SDT Q600 TG-DTA analyzer under Air atmosphere at a heating rate of 10° C. $min^{-1}$.

Results:

FIG. 1: (a) shows the thermogravimetric analysis (TGA) of CNF before and after the incorporation of PBI in air from room temperature to 1000° C. The pristine carbon nanofiber shows initially a small weight loss corresponding to residual water followed by continuous weight loss of carbon up to 800° C. No detectable amount of residual metals was present in pristine CNF. After incorporation of PBI, weight loss was observed from 300° C. itself attributing to the presence of PBI. The weight loss occurred at lower temperature as compared to those reported in the literature which may be due to the lower molecular weight of the PBI used (As indicated by its lower inherent viscosity). Moreover, the inner hollow cavity of CNF provide an intriguing one-dimensional confinement of PBI leading to limited intermolecular $H_2$ bonding. This effect also supports the above observation of weight loss at low temperature.

FIG. 1. (b) is the TGA corresponding to the electrocatalyst before (FNCF-Pt) and after (FNCF-Pt-PBI) PBI incorporation. In the case of FCNF-Pt, no appreciable weight loss was observed until 420° C. whereas in the case of FCNF-Pt-PBI, the weight loss corresponding to PBI was also observed. From the residue content, the amount of Pt in both these cases was calculated to be ~20 wt. %.

Analysis:

It can also be noted from the TGA profiles that in case of pristine CNF, the carbon loss occurs at a higher temperature as compared to the other two. This is in accordance with the fact that Pt nanoparticles dispersed on the CNF surfaces can act as the active sites to facilitate the oxidation of carbon, leading to a fast decomposition at a lower temperature compared to the pristine sample.

b. X-Ray Diffraction Method (XRD)

X-ray Diffraction (XRD) was conducted using a Phillips X'pert pro powder X-ray diffractometer (Cu, Kα radiation, Ni filter).

Figure 2:
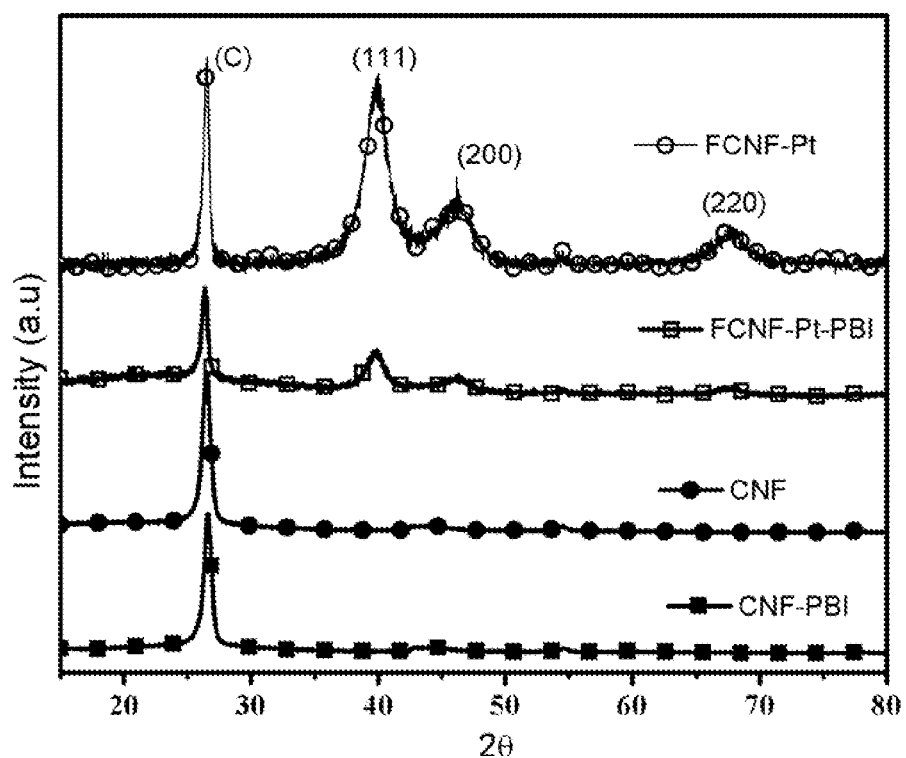
FIG. 2. shows the X-ray diffraction (XRD) patterns of pristine CNF, pristine CNF incorporated with PBI (CNF-PBI), FCNF-Pt and FCNF-Pt incorporated with PBI (FCNF-Pt-PBI), respectively.

Results:

FIG. 2. shows the X-ray diffraction (XRD) patterns of pristine CNF, pristine CNF incorporated with PBI (CNF-PBI), FCNF-Pt and FCNF-Pt incorporated with PBI (FCNF-Pt-PBI), respectively. A comparison of the XRD patterns of pristine CNF before and after incorporation does not show much difference. XRD pattern of FCNF-Pt shows three peaks at 2θ values of 40.10, 46.40 and 67.70, which can be indexed to (111), (200) and (220) planes of Pt, respectively which is in accordance with the face centered cubic structure. After incorporation with PBI solution same features are also retained, despite with less intensity.

Analysis:

The intensity difference may be attributed to the formation of a skin layer of polymer on the surface of Pt nanoparticles; also, the XRD patterns in both the cases are broader indicating smaller particles. The average crystalline size of the nanoparticles calculated for FCNF-Pt using Scherrer equation is 3.2 nm and 3.5 nm respectively, before and after the polymer incorporation, indicating only a marginal difference once the sample is subjected to the polymer wrapping process. These sizes are quite close to those from the HRTEM observations.

c. Determining the Morphology Transformations of Materials in Nanospace by HRTEM The HRTEM images were taken by a TECNAI-T 30 model instrument operated at an accelerating voltage of 300 kV. Samples for HRTEM imaging were prepared by placing a drop of the catalyst sample in isopropanol onto a carbon-coated Cu grid (3 nm thick, deposited on a commercial copper grid for electron microscope), dried in air and loaded into the electron microscopic chamber.

Figure 3:
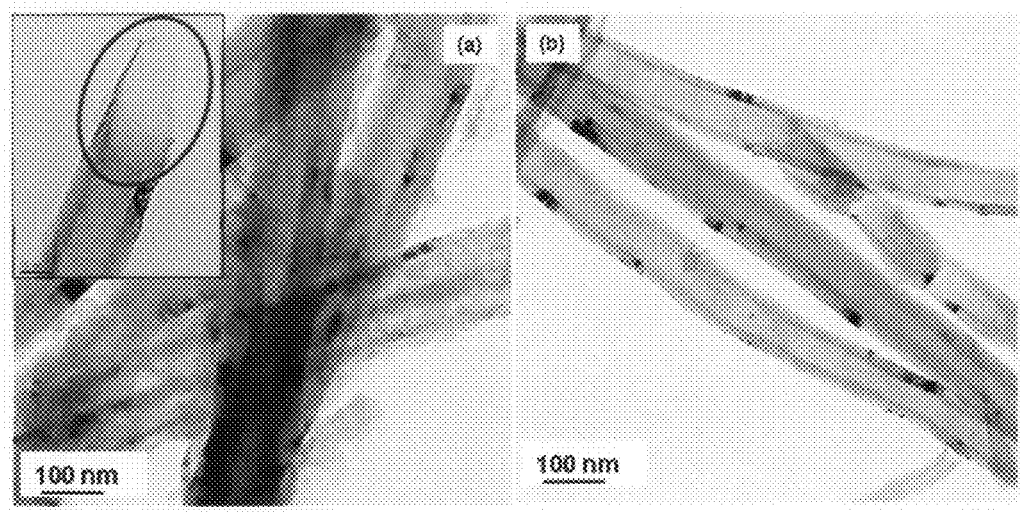
FIG. 3. (a) shows an overall view of pristine CNFs after incorporating PBI and (b) shows HRTEM image of pristine CNFs prior to PBI incorporation.

Results:

FIG. 3: (a) shows an overall view of pristine CNFs after incorporating PBI and the figure in the inset of the same clearly confirms that the polymer has entered from the open tip through capillary action.

Figure 4:
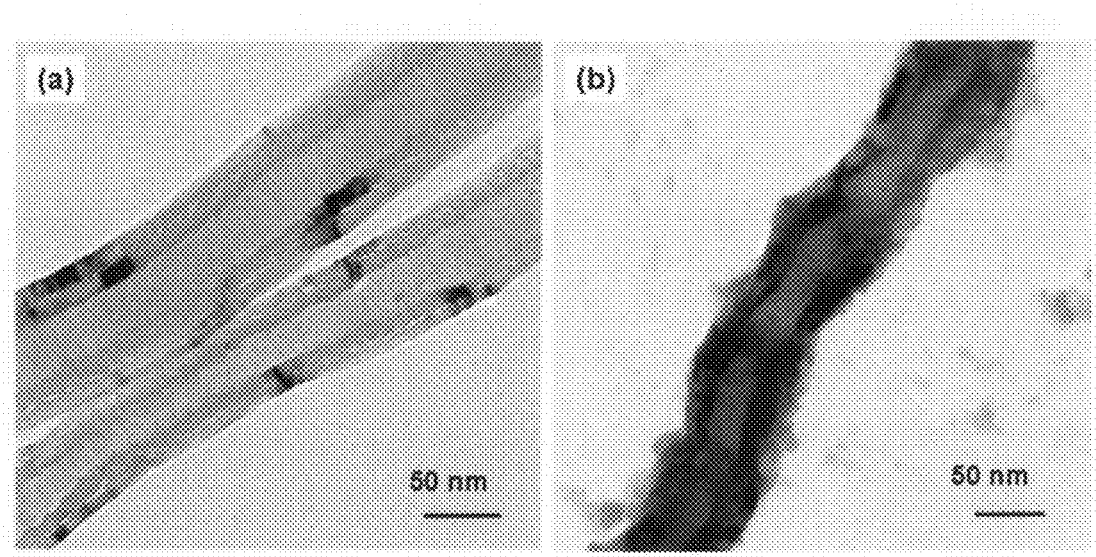
FIG. 4: (a) and (b) shows a direct comparison of a single carbon nanofiber before and after PBI incorporation.

FIG. 3: (b) shows HRTEM image of pristine CNFs prior to PBI incorporation (for an effective comparison of the contrast after incorporating PBI). The image clearly depicts that these are high aspect ratio material with length in few micrometers and diameter c.a. 100 nm. Further, these CNFs are having open tips with inner diameter c.a. 50 nm FIG. 4: (a) and (b) give a direct comparison of a single carbon nanofiber before and after PBI incorporation. The difference in the image contrasts of FIGS. 3, 4 (a) and (b) give a clear picture that PBI solution has entered inside the cavities of CNFs.

Analysis:

Images clearly depict that no change in the morphology of CNFs like swelling or busting is observed and the diameter (100 nm) remains the same even after the entry of the polymer. It is also observed that PBI is present on the outer wall of the CNFs as well, which could be due to the high wettability of the PBI solution. This observation confirms the theoretical prediction that wetting is a prerequisite for insertion by capillary action.

Figure 5:
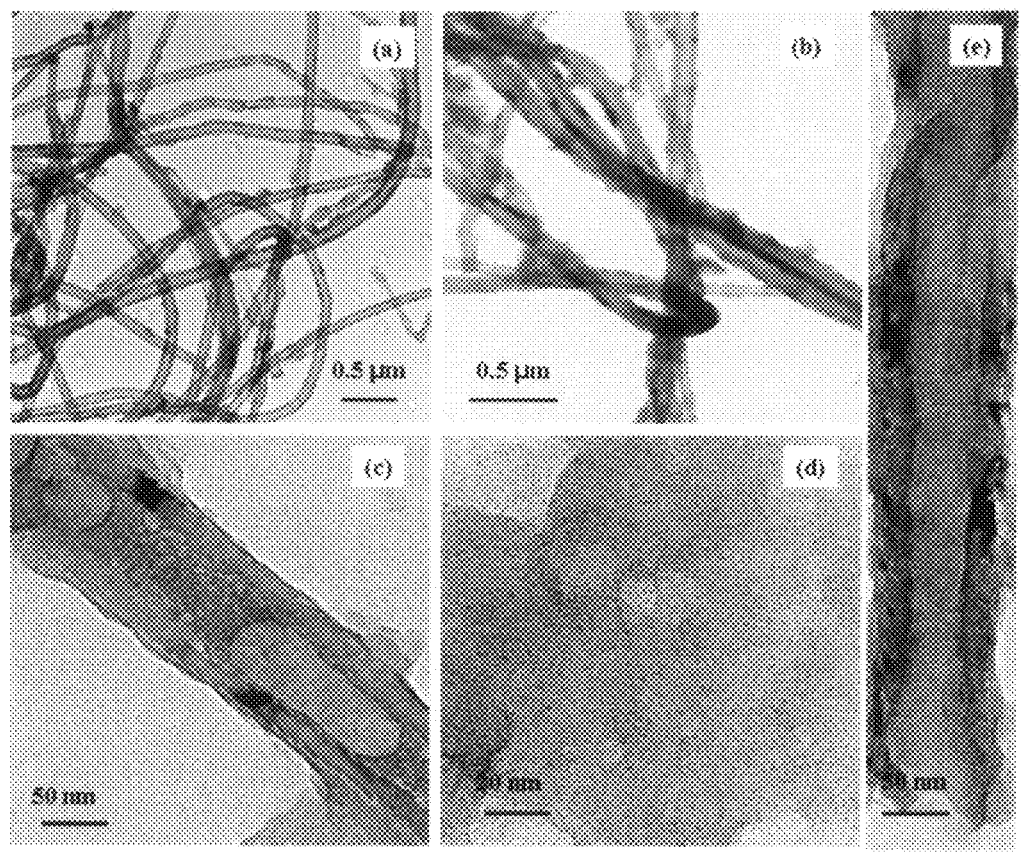
FIG. 5: HRTEM images of (a) high aspect ratio pristine CNFs, (b) CNFs incorporated with PBI, (c) PBI inserted single CNF along with Rh nanoparticle as a tracer in the polymer phase, (d) PBI mixed with Rh nanoparticles, (e) CNF with Rh tracer in PBI matrix showing the one-dimensional confinement of PBI phase inside the CNFs.

FIG. 5: HRTEM images of (a) high aspect ratio pristine CNFs, (b) CNFs incorporated with PBI, (c) PBI inserted single CNF along with Rh nanoparticle as a tracer in the polymer phase, (d) PBI mixed with Rh nanoparticles, (e) CNF with Rh tracer in PBI matrix showing the one-dimensional confinement of PBI phase inside the CNFs.

Analysis:

The image clearly depicts that using Rh nanoparticles as the tracer the presence of PBI in the inner cavity of CNFs is confirmed as the interior of the CNFs in FIGS. 1(c) and (e) and Fig (d) have the same contrast. Finally FIG. 1(e), a single CNF on a larger length scale, demonstrates the one-dimensional confinement of PBI inside the CNF.

Figure 6:
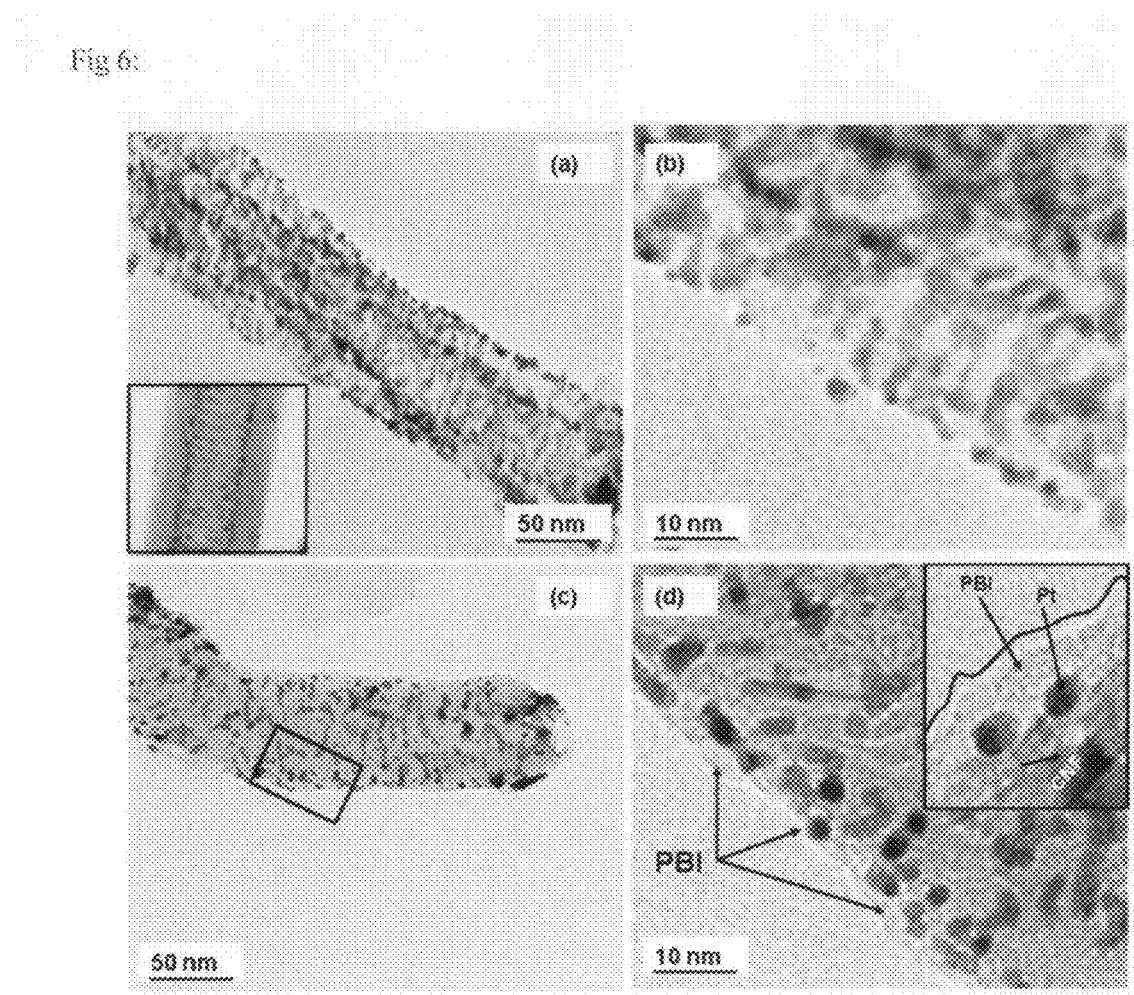
FIG. 6: HRTEM images of (a) FCNF-Pt; inset of (a) the image of CNF-Pt, (b) a portion of FCNF-Pt (c) FCNF-Pt with PBI showing a skin layer on the surface of Pt nanoparticles. (d) An enlarged view of the portion highlighted in image (c) clearly showing a skin layer of PBI formed on the Pt nanoparticles; the inset of (d) is the image showing the TPB formed on a single Pt nanoparticle.

FIG. 6: HRTEM images of (a) FCNF-Pt; inset of (a) is the image of CNF-Pt, (b) a portion of FCNF-Pt clearly depicting the dispersion and the size of the Pt nanoparticles, (c) FCNF-Pt with PBI showing a skin layer on the surface of Pt nanoparticles. (d) An enlarged view of the portion highlighted in image (c) clearly showing a skin layer of PBI formed on the Pt nanoparticles; the inset of (d) is the image showing the TPB formed on a single Pt nanoparticle.

Analysis:

FIGS. 6(a) and (b) show evenly decorated Pt nanoparticles with a size distribution of c.a. 3±0.5 nm on both the walls of F—CNF. The inset of FIG. 6(a) shows a catalyst with Pt nanoparticles decorated only in the inner wall due to the presence of active terminal graphene edges along this surface. FIG. 6(c), i.e. the image of FCNF-Pt after coating with a PBI, clearly shows the presence of a skin layer of PBI formed on the outer wall of FCNF-Pt. It is also clear that the tips are still open for further reactant entry. The images of Pt decorated samples do not reveal the presence of PBI along the inner cavity due to the narrow contrast difference because now we have to consider the contrast between CNF, Pt and PBI simultaneously while imaging. FIG. 6(d) represents the nature of the interface formed between PBI and the outer surface of the CNF to create the triple phase boundary (TPB) around the Pt nanoparticles decorated along the surface. The image shown in the inset of FIG. 6(d) gives a clear picture of the skin layer of the PBI formed on a single Pt nanoparticle, where the black line defines the clear boundary. Thus, it forms an ideal TPB where both the proton and electron conducting phases are in contact with the active catalyst particle. Even though the contrast issue masks the PBI inserted in the Pt decorated sample, a similar TPB is also established along the inner wall of CNF.

d. Electrochemical Measurements:

The electrochemical activity of the composite composed of MWNTs, PBI and Pt nanoparticles is evaluated using cyclic voltammetric analysis and its activity is compared with the nanocomposite made up of carbon nanofiber, PBI and Pt (FCNF-Pt-PBI) and also to a catalyst composed of conventional Nafion binder, MWNTs/CNFs and Pt nanoparticles.

Accordingly, a conventional three electrode system with a 5 mm diameter glassy carbon (GC) electrode coated with the sample as the working electrode (WE), Ag/AgCl as the reference electrode (RE) and Pt foil as the counter electrode (CE) was used for all the experiments. The GC electrode was polished using 0.3 and 0.05 µm alumina slurries, followed by washing with water and acetone. A 10 µL aliquot of the catalyst slurry prepared by dispersing 5 mg of the catalyst in 1 mL of the PBI solution in DMAc (0.25 wt %) was placed on a polished glassy carbon electrode and then dried in air to remove the solvent. After that, it was dipped in 10 mL of polyphosphoric acid, dried in air and was used as the WE. To record CV with Nafion coated on the surface, working electrode was prepared as follows: 10 µL aliquot of the slurry made by sonicating 5 mg of the catalyst in 1 mL DMAc was drop-coated on glassy carbon electrode. After this, 2 µl of 0.01 wt. % Nafion diluted with ethanol was coated on the surface of the catalyst layer to yield a uniform thin film and was dried in air. The CV was measured in 0.5 M HClO4 deaerated with $N_2$ at a scan rate of 50 mVs$^{-1}$.

Figure 7:
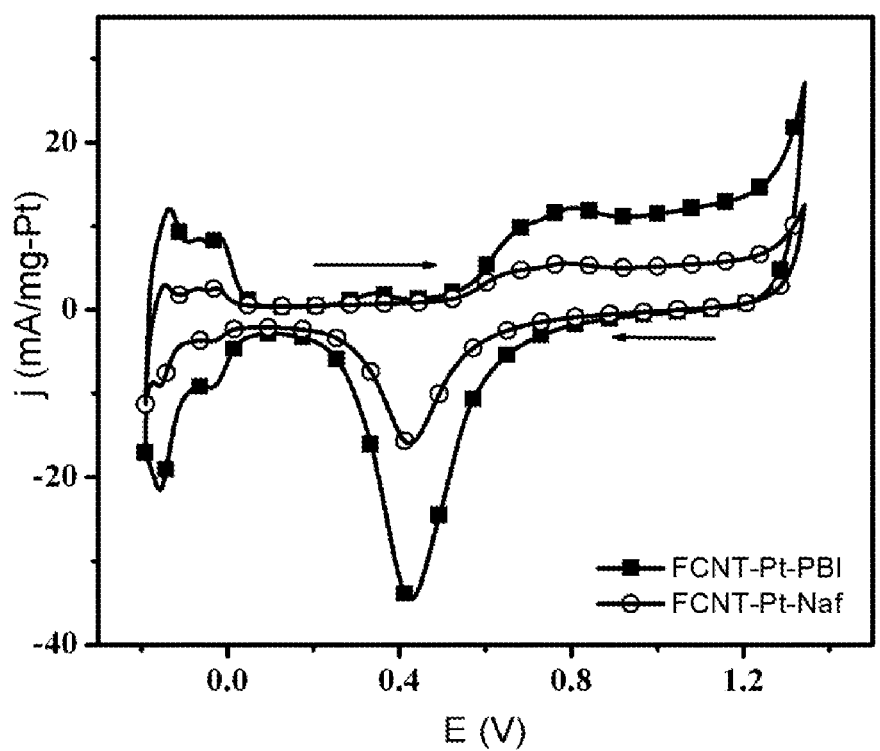
FIG. 7: shows cyclic voltammograms of FCNT-Pt-PBI and FCNT-Pt-Naf

FIG. 7: shows cyclic voltammograms of FCNT-Pt-PBI and FCNT-Pt-Naf

The electrochemically active surface area (ECSA) calculated from the CV for FCNT-Pt-Naf catalyst is 49 cm$^2$ (mg-Pt)$^{-1}$, whereas for the composite made up of MWNT, PBI and Pt (FCNT-Pt-PBI) the active area obtained is 130 cm$^2$ (mg-Pt)$^{-1}$.

Figure 8:
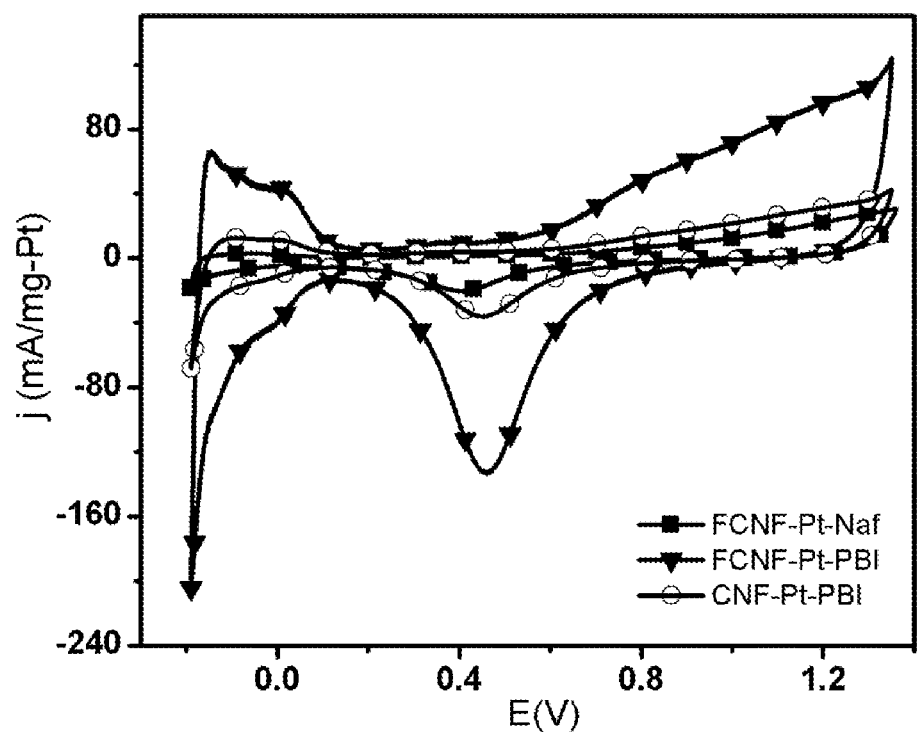
FIG. 8: Shows cyclic voltammograms of FCNF-Pt-Naf, FCNF-Pt-PBI, CNF-Pt-PBI

FIG. 8: Shows cyclic voltammograms of FCNF-Pt-Naf, FCNF-Pt-PBI, CNF-Pt-PBI

The electrochemically active area is [320 cm$^2$ (mg-Pt)$^{-1}$] for FCNF-Pt-PBI catalyst, which is 6 times higher as compared to the Nafion supported catalyst [55 cm$^2$ (mg-Pt)$^{-1}$]. For the catalyst with Pt decorated only in the inner cavity and using PBI as the binder, the ECSA obtained is [85 cm$^2$ (mg-Pt)$^{-1}$], which itself is higher as compared to the one prepared by using Nafion as the binder and the catalyst with Pt on both the walls.

Figure 9:
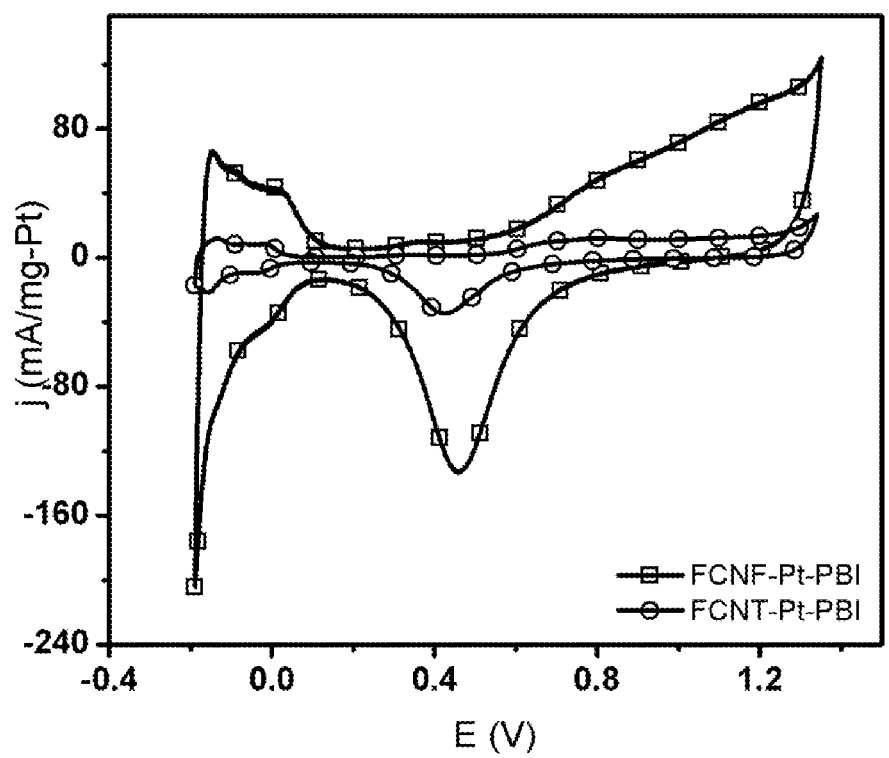
FIG. 9: shows cyclic voltammograms of FCNT-Pt-PBI and FCNF-Pt-PBI

Further FIG. 9: shows cyclic voltammograms of FCNT-Pt-PBI and FCNF-Pt-PBI

Here the corresponding electrochemically active area is 320 cm$^2$ (mg-Pt)$^{-1}$ and 130 cm$^2$ (mg-Pt)$^{-1}$ respectively for nanofibers and MWNT composite with PBI and Pt nanoparticles.

Analysis:

The increase in active area from 49 to 130 cm$^2$ (mg-Pt)$^{-1}$ in case of MWNTs and from 55 to 320 cm$^2$ (mg-Pt)$^{-1}$ for FCNFs demonstrates the potential benefits of PBI in modulating the electronic properties of the support coupled with the improved proton conductivity. The additional benefit obtained in terms of electrochemical active area in case of nanofibers is due to the effective utilization of inner cavity of the nanofibers also for Pt nanoparticle decoration and PBI incorporation.

We claim:

1. A high aspect ratio multifunctional material comprising functionalized hollow carbon nanofibers (CNF) coated with metal nanoparticles in phosphoric acid doped polybenzimidazole (PBI) along the inner and outer surfaces of the hollow carbon nanofibers;
   wherein the metal nanoparticles have a size of 3-4 nm.

2. The material as claimed in claim 1 wherein said carbon nanofibers are 80-120 nm in diameter and 5-10 micrometers in length.

3. The material as claimed in claim 2 wherein said carbon nanofibers are 100 nm in diameter.

4. The material as claimed in claim 1 wherein said carbon nanofibers are of high aspect ratio of greater than 10.

5. The material as claimed in claim 4 wherein said carbon nanofibers are of high aspect ratio of 10-15.

6. The material as claimed in claim 1, wherein the phosphoric acid doped PBI has inherent viscosity in the range of 0.1-0.5 $dLg^{-1}$.

7. The material as claimed in claim 1, wherein the metal nanoparticles is loaded in the range of 2-60 weight %.

8. A process for the fabrication of the high aspect ratio multifunctional material as claimed in claim 1, wherein the said process comprising the steps of;
   a) preparing phosphoric acid doped polybenzimidazole polymer by a solution polycondensation method;
   b) dispersing Pt or Rh nanoparticles into the tubular region of carbon nanofibers by a simultaneous dispersion and reduction through polyol process;
   c) encapsulating the phosphoric acid doped PBI in a solvent as obtained in step (a) with metal dispersed carbon nanofibers as obtained in step (b) to obtain high aspect ratio multifunctional material.

9. The process as claimed in claim 8, wherein phosphoric acid doped PBI and the metal nanoparticles are incorporated on both the inner and outer walls of carbon nanofibers by a process based on the wetting and capillary action of solvent medium.

10. The process as claimed in claim 8, wherein step (a) or (c) uses a dipolar aprotic solvent.

11. The process as claimed in claim 10, wherein the dipolar aprotic solvent is selected from the group consisting of acetone, methyl ethyl ketone, ethylacetate and N,N dimethyl acetamide (DMAc).

12. An article comprising the high aspect ratio multifunctional material according to any of claims 1-7, wherein the article is a fuel cell, a solar cell, a supercapacitor, a sensor, or a drug delivery system.

13. The material of claim 1, wherein the metal nanoparticles is loaded in the range of 15-25 weight %.

14. The material as claimed in claim 1, wherein the metal nanoparticles is loaded in the range of 2-20 weight %.

15. The material of claim 1, wherein the phosphoric acid doped PBI has inherent viscosity in the range of 0.47-0.5 $dLg^{-1}$.

* * * * *